UNITED STATES PATENT OFFICE.

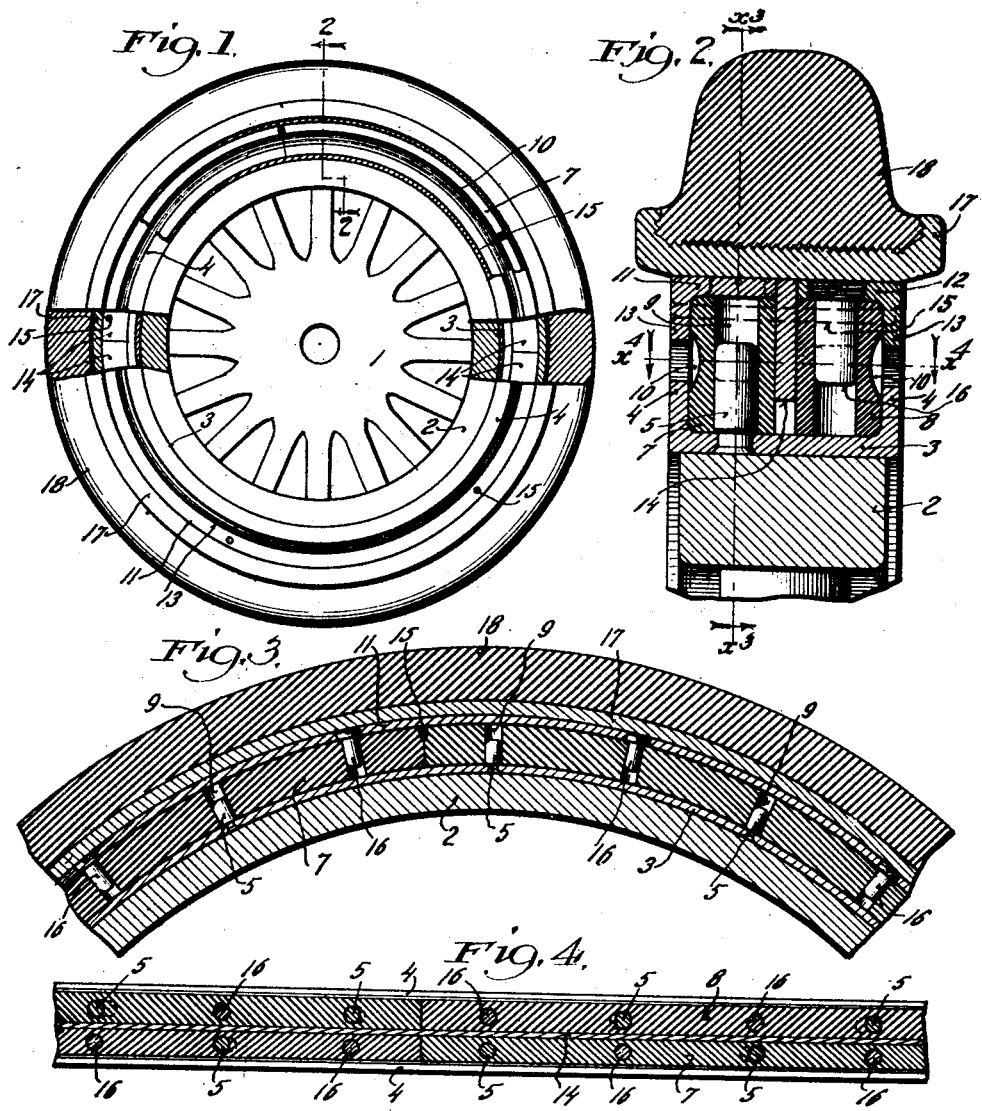

FREDERICK O. MEYERS, OF LOS ANGELES, CALIFORNIA, ASSIGNOR TO PACIFIC AUTOMOTIVE COMPANY, OF LOS ANGELES, CALIFORNIA, A CORPORATION OF CALIFORNIA.

CUSHION-WHEEL.

1,366,540.    Specification of Letters Patent.    Patented Jan. 25, 1921.

Application filed August 4, 1919. Serial No. 315,053.

*To all whom it may concern:*

Be it known that I, FREDERICK O. MEYERS, a citizen of the United States, residing at Los Angeles, county of Los Angeles, State of California, have invented a new and useful Cushion-Wheel, of which the following is a specification.

My invention relates to cushion wheels and is more particularly directed to that type of wheel having a cushion interposed between the felly and the outer tire or tread surface.

One of the objects of the invention is to provide a wheel having a cushion element formed with radial pockets engaged by intermeshing studs and in which the air is held and compressed to a greater or less extent.

Another object is to provide a cushion means admitting lateral movement of the tire relative to the wheel, which means also includes a thrust element limiting said lateral movement and preventing a stripping of the tire from the wheel.

A further object is to provide a wheel construction in which the driving studs engage the cushion elements in relative staggered relation circumferentially and in which each series of studs is alternately disposed on opposite sides of a thrust element, the studs and thrust element coöperating to limit the lateral movement of the tire relative to the wheel, and the studs and cushion providing a yielding driving connection between the tire and wheel, having a relatively wide zone of coöperative transverse engagement.

With these and other incidental objects in view the invention consists of certain novel features of construction and combination of parts, the essential elements of which are recited in the appended claims and a preferred form of embodiment of which is described in detail hereinafter and fully illustrated in the accompanying drawing forming a part of this specification.

In the drawing corresponding reference characters designate corresponding parts throughout the several views of which:

Figure 1 is a side elevation of a wheel partly broken away and in section to more clearly show certain details of construction.

Fig. 2 is an enlarged section on line 2—2 of Fig. 1.

Fig. 3 is a section on line 3—3 of Fig. 2.

Fig. 4 is a section on line $x^4$—$x^4$ of Fig. 2.

Referring to the drawings 1 designates the wheel proper and 2 the ordinary wood felly. Shrunk on the felly is a channel-shaped member 3 having upstanding flanges 4—4 forming a channel or groove as a seat for the cushion elements. Attached, as by riveting, to the channel member 3 is a series of pins or studs 5, extending radially and relatively alternately staggered in their disposition around the wheel. The cushion elements 7—8 are substantially rectangular in cross section and, as illustrated, each consists of five sections forming an annular ring. These cushion elements are made sectional to facilitate assembling, it being obvious that the number of sections composing the rings is immaterial and also that if desired they could be made integral. Each cushion element is provided with a series of radial orifices 9 and a shallow groove 10.

The cushion elements are seated within the channel of the member 3 with the studs 5 entering the orifices 9 registering therewith.

A second or outer channel shaped member is formed of two opposed rings 11—12 each having inturned flanges 13, and an intermediate thrust ring 14 all secured together as an integral unit, by transverse rivets 15. Screw-threaded into each ring 11—12 and extending inwardly is a series of radial pins or studs 16, the studs of the ring 11 being circumferentially disposed in staggered relation to those of the ring 12, with all of said studs engaging into the alined orifices 9 of the cushion elements. A tire rim 17, supporting the tire 18, is driven on the outer channel member to form a rigid structure therewith.

From the above it will be noted that each set of studs is circumferentially staggered on alternate sides of the thrust ring 14, (see Fig. 4) that the studs on either side of said ring alternate, (see Fig. 3) and that the studs of both sets are alined and alternate transversely, (see Figs. 2 and 4.)

It will be evident that as the cushion elements are compressed the opposed flanges 4 and 13 of the inner and outer channel members will come together, more or less, tending to pinch the sides of said cushion elements. Therefore it is to eliminate this objectionable tendency that the cushion elements are provided with the side grooves 10.

To promote convenient assembling the thrust ring 14 consists of two sections and the transverse tie rivets 15 are located at the ends of each section of the cushion elements, said sections being notched, (see Fig. 3), to provide clearance for the rivets.

When the wheel is under load the cushion on the lower portion of the wheel will be compressed and the studs will be forced farther into their cushion orifices compressing the air contained therein. This pocketed construction provides a greater degree of resiliency than would be obtained with a solid cushion element and also minimizes the creeping action by allowing the cushioning material adjacent the orifices to expand therein and subsequently readjust to its original position.

The power is transmitted through the wheel proper and the felly to the inner channel member 3 and studs 5 carried thereby. The power is then transmitted through said studs to the cushion elements and in turn is transmitted by the studs 16 to the outer channel member, tire rim 17 and tire 18.

This arrangement provides a cushion element which is interposed between the driving element and the traction surface of the road tire, and which provides a yielding driving connection between the wheel proper and the tire to compensate for road shocks and for sudden driving strains.

When transversely forced against road obstructions or through skidding on slippery pavements the tire is subjected to severe side thrusts, and therefore the present construction provides for a slight lateral movement of the tire relative to the felly and wheel proper and to prevent the tire from being stripped from the felly by such side thrust while at the same time allowing for a cushioned lateral movement the thrust ring 14 is provided. This thrust ring provides for an effective cushioning action which is necessary to relieve the wheel proper from excessive side thrust strains, and at the same time prevent a stripping of the tire from the wheel.

The specific construction herein shown and described is well adapted to fulfil the objects primarily set forth and while of a preferred form it is not intended that the invention be limited thereto as it is susceptible of various modifications all coming within the scope of the appended claims.

I claim:

1. A cushion wheel comprising an inner wheel member, a tire rim laterally movable relative thereto, a pair of opposed channel members secured respectively to the wheel member and tire rim, a thrust member extended radially from one of the channel members, cushion elements seated in said channels on opposite sides of the thrust member and a plurality of studs extending radially from and beyond the side walls of each channel member and engaging the cushion elements.

2. A cushion wheel comprising an inner wheel member, a tire rim laterally movable relative thereto, a pair of opposed channel members secured respectively to the wheel member and tire rim, a thrust member extending radially from one channel member, a series of circumferentially staggered fixed studs extending radially from said channel member and alternately positioned on opposite sides of the thrust member, a second series of circumferentially staggered fixed studs extending radially from the other channel member positioned intermediate the studs of the first series, and cushion elements positioned within the channel members on opposite sides of the thrust member and having radial orifices registering with the studs of both series, the studs laterally compressing the cushion elements during a lateral deflection of the tire rims.

3. A cushion wheel comprising an inner wheel member, a tire rim laterally movable relative thereto, a pair of opposed channel members secured respectively to the wheel member and tire rim, cushion elements seated in said channels and provided with transversely coincident series of radial orifices, and a plurality of studs extending from each channel member into alternate orifices of both series, the studs of one channel member extending to overlap the studs of the opposite channel member, and functioning to laterally compress the cushion elements during a lateral deflection of the tire rim.

4. A cushion wheel comprising an inner wheel member, a tire rim laterally movable relative thereto, a pair of opposed channel members secured respectively to the wheel member and tire rim, cushion elements seated in said channels and provided with a plurality of radial orifices, a series of circumferentially staggered studs fixed to and extended outwardly from the inner channel member and a second series of circumferentially staggered studs fixed to and extended inwardly from the outer channel member, the studs of both series being relatively alternately arranged and coöperatively engaging the orifices of the cushion element, establishing a driving connection between the channel members and functioning to compress the cushion elements during a lateral deflection of the tire rim.

5. A cushion wheel comprising an inner wheel member, a tire rim laterally movable relative thereto, a pair of opposed channel members secured respectively to the wheel member and tire rim, a cushion element seated in said channels, a plurality of studs extending from each channel member and engaging the cushion element and means for limiting a lateral deflection of the tire rim relative to the wheel member, the studs establishing a driving connection between the channel members and functioning to compress the cushion element during a lateral deflection of the tire rim.

6. A cushion wheel comprising an inner wheel member, a tire rim laterally movable relative thereto, a pair of opposed channel members secured respectively to the wheel member and tire rim, cushion elements seated in said channels, a plurality of studs extending from each channel member and engaging the cushion element, and a thrust ring movable with the tire rim and engaging the cushion elements to limit a lateral deflection of the tire rim relative to the wheel member, the studs establishing a driving connection between the channel members and functioning to compress the cushion elements during a lateral deflection of the tire rim.

Signed at Los Angeles, California, this 29th day of July, 1919.

FREDERICK O. MEYERS.

Witnesses:
CLARENCE B. FOSTER,
L. BELLE WEAVER.